No. 851,392. PATENTED APR. 23, 1907.
A. W. BALL & M. T. SEYMOUR.
LIGHTNING ARRESTER.
APPLICATION FILED OCT. 24, 1904.
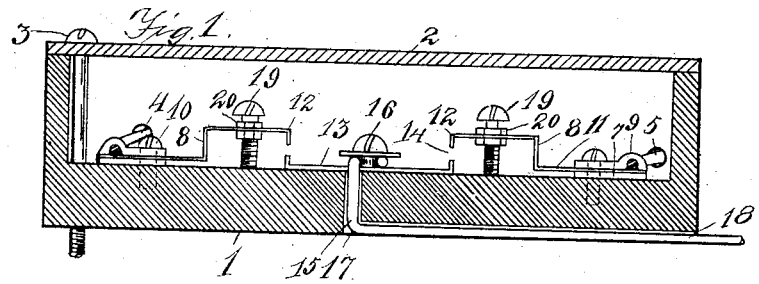
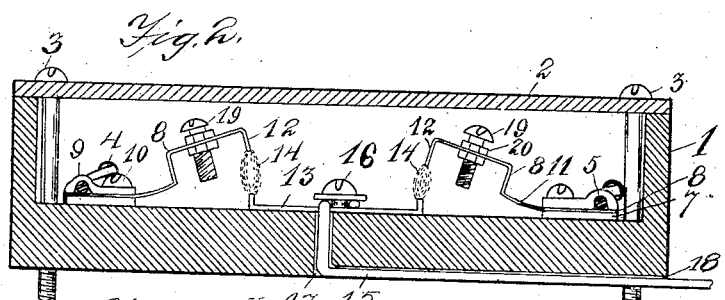
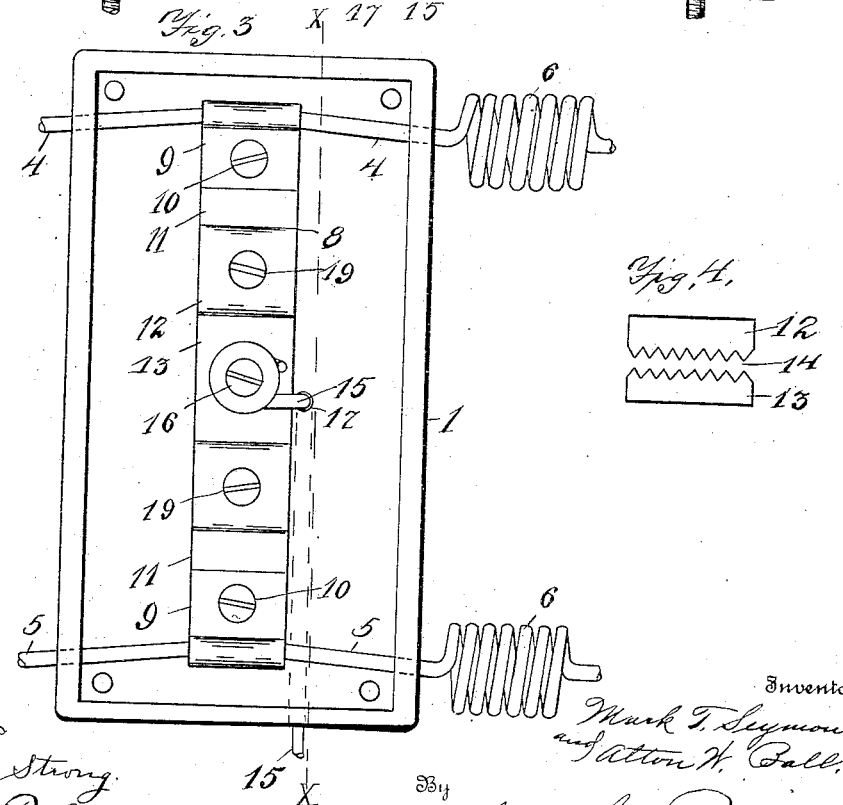
Witnesses
R. E. Strong.
F. E. Baldwin.
Inventors
Mark T. Seymour
and Atton W. Ball.
By S. Arthur Baldwin.
Attorney

UNITED STATES PATENT OFFICE.

ALTON W. BALL AND MARK T. SEYMOUR, OF STOW, NEW YORK.

LIGHTNING-ARRESTER.

No. 851,392.　　　Specification of Letters Patent.　　　Patented April 23, 1907.

Application filed October 24, 1904. Serial No. 229,679.

*To all whom it may concern:*

Be it known that we, ALTON W. BALL and MARK T. SEYMOUR, citizens of the United States, and residents of Stow, in the county of Chautauqua and State of New York, have invented a new and useful Lightning-Arrester, of which the following, taken in connection with the accompanying drawings, is a full, clear, and exact description.
This invention relates to lightning arresters for the protection of electrical apparatus; and the object of the invention is to provide a device which shall be included within the electrical circuit and by means of which over-charges of electricity from either the lightning or dynamo shall pass harmlessly to the ground wire, and which is not easily carbonized or burnt out by such over-charges.

In the drawings, Figure 1 is a sectional view of the arrester at line X X in Fig. 3, and showing the parts quiescent. Fig. 2 is a sectional view at line X X in Fig. 3, showing the action of the parts at the moment of the reception of the heavy over-charge of electricity. Fig. 3 is a plan view of the lightning arrester in upright position with the front plate removed and showing the same connected up for use. Fig. 4 is a detail view of the serrated openings in the spring plate across which the over-charges of electricity jump.

Similar numerals refer to corresponding parts in the several views.

The numeral 1 indicates the main portion of the block, which is made of porcelain or other suitable material and which has a suitable closure or front plate 2, which is attached to the block 1 by means of suitable screws 3. Block 1 is placed in an upright position, as shown in Fig. 3, so that wires 4 and 5 of the electrical circuit shall incline downward slightly and not allow the water to follow the same into the box. In telephone and telegraph construction the side on which the wires 4 and 5 extend to the instrument, has choke coils 6 inserted in the same, which choke the electricity back into the box should it run through and thus the coil keeps the over-charge from the instrument.
A metal plate 7 is placed within the box-like opening in block 1 near each end and a strip 8, preferably of spring sheet brass or German silver, is secured to each plate 7 by brass blocks 9 and suitable screws 10. Brass blocks 9 have slight upward bends which form an opening to receive wires 4 and 5 and press the same against the strips 8, thus forming a positive connection between the wires and the strips.

Strips 8 are extended out from holding plates 7 and 9, as at 11 toward each other and a sufficient distance to allow for the springing of the strips outward from block 1. They are then given an upward and downward bend 12 so as to extend over a corresponding strip of sheet metal 13 centrally placed and having upwardly bent ends toward the downwardly bent ends 12. A space is left between these ends for the overcharge to jump and the edges of the ends of parts 12 and 13 are given a saw tooth or serrated form, as shown at 14 in Fig. 4, so that the electricity can form an arc between these serrated points as it passes to a ground wire 15 which is held in positive contact with plate 13 by means of a screw and washer 16. Ground wire 15 passes through an opening 17 in block 1 and along a slot 18 to the lower end of the block and from thence to the ground.

Set screws 19 are placed in the upwardly bent portions 12 of strips 8 with suitable set nuts 20 on each side of strip 8 and extend down so as to bear against block 1 in order that the strips shall not come closer together at the serrated opening 14 than is required by the strength of the regular current which is passing through wires 4 and 5, for the opening 14 is made wide enough so that the regular current will not jump across the same and so be grounded, but so that any appreciable addition to the potential of said current will jump across said opening and the over-flow will seek the ground wire as above described.

The action of the over-charge of electricity from lightning or other source when it enters upon both or either of wires 4 and 5 is to pass through strips 8 jumping the space 14 and forming arcs between the serrated points. The spring 11 is made light and it is experimentally found that the arc forces the points apart. A continuous current would of course fuse the points together, but lightning comes more in the form of an alternating current or quick shock of high potential which forms an arc and forces the points apart, as above stated. The larger the bolt of lightning or current of electricity, the larger of course will be the arc and the immediate effect would be to force plates 8 and 13 apart as plates 8 spring out at the point 11, as shown in Fig. 2. The distance which they are forced apart being governed by the size of the arc. In consequence of this springing apart, the serrated points are not carbonized or burnt off, as they would be if they were placed at a fixed distance so that they would be within the arc and under intense heat. When the arc subsides, the set screws 19 gage the return of the part 12 of strip 8 so that the arrester is immediately set to receive a new over-charge and is never out of commission.

The main office of the resilience or spring in the plates is to permit their separation when forced apart by an over charge of electricity and then to compel their return to normal position after the over charge so that the arrester is never out of commission. As is well known, charges of lightning come in such quick succession ofttimes that an arrester cannot be readjusted by hand. In fact, it would be extremely hazardous to attempt such readjustment. The purpose of the springs is to compel such readjustment of the plates to normal position that they will instantly be in position to receive a succeeding charge of electricity.

I claim as new:

1. A lightning arrester composed of a suitable support, a ground wire plate on said support, a line wire plate on said support separated a short distance from said ground wire plate, and means of resilience to permit greater separation of said plates and the return to normal position.

2. A lightning arrester composed of a suitable support, a ground wire plate on said support, line wire plates on said support separated short distances from said ground wire plate, said line wire plates having resilience to permit increased separation from said ground wire plate and to return the line wire plates to normal position.

3. A lightning arrester composed of a suitable support, a ground wire plate on said support having an upturned end, a line wire plate on said support and extending over said upturned end and separated therefrom, a spring portion in said line wire plate to allow increased separation and compel its return to normal position.

4. In a lightning arrester, the combination of a suitable support, a ground-wire plate having up-turned ends and means for securing to said support, line-wire plates secured to said support and extending over said up-turned ends at a short distance therefrom, a spring portion in said line-wire plates, and set screws in said line-wire plates to regulate the distance between the adjacent ends of the ground-wire and line-wire plates.

5. In a lightning arrester, the combination of the support 1, the central ground-wire plate 13 secured on said support and having up-turned serrated ends, line-wire plates 8 secured on said support and extending a serrated end 12 over said up-turned ends, a spring portion 11 in said extended portion of plates 8, and set screws 19 in ends 12 of plates 8 having bearing against said support, substantially as and for the purpose specified.

In testimony whereof we have signed our names to this specification in the presence of two subscribing witnesses.

ALTON W. BALL.
MARK T. SEYMOUR.

Witnesses:
F. E. BALDWIN,
S. A. BALDWIN.